US011632305B2

(12) United States Patent
Potluru et al.

(10) Patent No.: US 11,632,305 B2
(45) Date of Patent: Apr. 18, 2023

(54) METHOD AND SYSTEM FOR LINK PREDICTION IN LARGE MULTIPLEX NETWORKS

(71) Applicant: JPMorgan Chase Bank, N.A., New York, NY (US)

(72) Inventors: Vamsi Krishna Potluru, New York, NY (US); Robert Elliott Tillman, Long Island City, NY (US); Prashant P Reddy, Madison, NJ (US); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

(21) Appl. No.: 17/336,703

(22) Filed: Jun. 2, 2021

(65) Prior Publication Data

US 2022/0393951 A1 Dec. 8, 2022

(51) Int. Cl.
*H04L 29/08* (2006.01)
*H04L 41/147* (2022.01)
*H04L 41/16* (2022.01)
*H04L 41/12* (2022.01)

(52) U.S. Cl.
CPC ............ *H04L 41/147* (2013.01); *H04L 41/12* (2013.01); *H04L 41/16* (2013.01)

(58) Field of Classification Search
CPC ..................................................... H04L 41/147
See application file for complete search history.

(56) References Cited

U.S. PATENT DOCUMENTS

| 11,228,505 | B1 * | 1/2022 | Wang | ..................... H04L 41/142 |
| 2022/0138440 | A1 * | 5/2022 | Li | ............................ G06N 3/08 |
| | | | | 704/2 |

* cited by examiner

*Primary Examiner* — Adnan M Mirza
(74) *Attorney, Agent, or Firm* — Greenblum & Bernstein, P.L.C.

(57) ABSTRACT

A method and a system for using a graph neural network framework to implement a link prediction in a multiplex network environment is provided. The method includes: identifying a plurality of layers of a multiplex network, each respective layer including a respective plurality of nodes; for each node included in at least a first layer, providing, by a structural node label and determining a common embedding across all of the plurality of layers and an individual embedding for each individual layer; using a k-nearest approach to select a subset of the plurality of layers for performing link prediction with respect to each layer based on the determined embeddings; and performing a link prediction by determining a respective feed-forward network with respect to each layer included in the selected subset.

20 Claims, 5 Drawing Sheets

METHOD AND SYSTEM FOR LINK PREDICTION IN LARGE MULTIPLEX NETWORKS

BACKGROUND

1. Field of the Disclosure

This technology generally relates to methods and systems for node classification and link prediction, and more particularly to methods and systems for using a graph neural network framework to implement a link prediction in a large multiplex network environment.

2. Background Information

One of the most fundamental problems in network analysis is link prediction. In particular, given a social network of users, there is a utility in predicting whether two people are connected based on observing existing links between the users. Several conventional approaches have been proposed for addressing this problem, and these approaches may generally be broadly classified into two categories: supervised methods and heuristics.

Heuristic approaches, while relatively simple and computationally efficient, have performed surprisingly well across a wide range of network domains. Supervised approaches set up the problem as a classification problem where the existence of a link can be seen as a binary label and features extracted from the structure of the graph can be used to learn a model. These approaches tend to have improved performance over heuristic methods, but this performance comes at the additional computational price of learning these models.

Graph neural networks have gained prominence due to their excellent performance in many classification and prediction tasks. In particular, they are used for node classification and link prediction, which have a wide range of applications in social networks, biomedical datasets and financial transaction graphs. Most of the existing work focuses primarily on the monoplex setting, where access to the network with only a single type of connection between entities is available. However, in the multiplex setting, where there are multiple types of connections, or layers, between entities, performance on tasks such as link prediction has been shown to be stronger when information from other connection types is taken into account.

The following is a discussion about existing conventional approaches for link prediction in the monoplex and multiplex settings, Primary conventional approaches include generating features using random walks and graph neural networks. Graph attention based networks have also been recently proposed which leverage self-attention layers to attend over the neighborhood features. Node2vec utilizes random walks to embed local neighborhoods.

For a monoplex setting, SEAL is a graph neural network-based approach that has shown excellent performance for link prediction. Graph structure features can be extracted from the observed node and edge structures of a network and encompass heuristic approaches such as common neighbors. However, the approach utilizes a fully-connected neural network. This was replaced by graph neural network (GNN) to enable better feature learning in SEAL. GNN typically consists of graph convolution layers which extract local substructures for the nodes and a graph aggregation layer for aggregating these node features into graph features. Many of these approaches can be unified by a messaging passing framework. It also allows incorporating explicit or latent node features and has shown strong performance on link prediction in the monoplex setting. It has three main components. (A) structural node labels, (b) node embeddings, and (c) node attributes. In order to obtain structural node labels, a node labeling scheme known as Double-Radius Node Labeling (DRNL) is introduced and used to assign labels 1 to the two nodes for which a prediction will be made if an edge exists and successively increase the label number as the distance increases from either target node. The purpose is to mark the different roles of the nodes in an enclosing subgraph which would inform a GNN on which nodes require focus for the link prediction task. These labels are then utilized to construct on-hot encoding vectors as input to the GNN. SEAL is flexible in which GNN architecture it uses and a default architecture known as DGCNN may be used. DGCNN takes the input graph and extracts features by passing through multiple graph convolutions layers where node information is propagated between neighbors. The vertex features which are extracted are then passed to a SortPooling layer which arranges them based on their structural role in the graph. It is feasible to learn higher-order heuristics by considering only a smaller enclosing subgraphs.

A popular approach for link prediction in multiplex networks is the recently proposed embedding approach MNE. MNE learns a common base embedding utilizing all the links in all the networks and individual node embeddings for each of the layers and combining these two to obtain the final node embedding. In particular for each node, a high-dimensional common embedding across all the layers and a smaller embedding for each individual layer may be learned. The two embeddings are combined via a linear transformation which is learned from the training data. The model is learned by utilizing random walks on each layer type to generate a sequence of nodes and then a skip-gram algorithm used in the context of word2vec is used to learn the embeddings.

As described above, MNE uses a base embedding to aggregate information across the layers. In the case of a few layer, this might be a reasonable approach as a way of sharing information across the layers. However, when the number of layer is large, i.e., in the dozens or hundreds, there is a possibility that information may be incorporated that is not relevant for the layer under consideration. Further, MNE does not use label information from the other layers which could be useful in the case where the embeddings are not as informative.

Accordingly, there is a need for a methodology for using a graph neural network framework to implement a link prediction in a large multiplex network environment.

SUMMARY

The present disclosure, through one or more of its various aspects, embodiments, and/or specific features or sub-components, provides, inter alia, various systems, servers, devices, methods, media, programs, and platforms for using a graph neural network framework to implement a link prediction in a large multiplex network environment.

According to an aspect of the present disclosure, a method for using a graph neural network framework to implement a link prediction in a multiplex network environment is provided. The method is implemented by at least one processor. The method includes: identifying, by the at least one processor, a plurality of layers of a multiplex network, each respective layer of the plurality of layers including a respective plurality of nodes; for each node included in at least a first layer from among the plurality of layers, providing, by the at least one processor, a structural node label and determining, by the at least one processor, a common embedding across all of the plurality of layers and an individual embedding for each individual layer from among the plurality of layers; using, by the at least one processor, a k-nearest approach to select a subset of the plurality of layers for performing link prediction with respect to each layer based on the determined embeddings; and performing, by the at least one processor, a link prediction by determining a respective feed-forward network with respect to each layer included in the selected subset.

The providing of the structural node label and the determining of the common embedding and the individual embedding may be performed for each node included in at least ten layers from among the plurality of layers.

A value of k may be selected based on computing a nearest neighbor embedding across all of the layers included in the plurality of layers.

The using of the k-nearest approach to select the subset may include randomly selecting a predetermined number of layers for performing the link prediction for each layer.

The using of the k-nearest approach to select the subset may include: selecting a predetermined number of layers from among the plurality of layers; determining, for each of the predetermined number of layers, a respective count of a number of selections by a k-nearest layer; and selecting the subset for performing the link prediction based on the determined counts for all layers included in the predetermined number of layers.

The providing of the structural node label may include using a double-radius node labeling protocol to assign a respective label to each node.

The performing of the link prediction for a particular layer may include using a self-attention mechanism to combine information that relates to at least two layers that are different from the particular layer with the determined embeddings in order to perform the link prediction.

According to another exemplary embodiment, a computing apparatus for using a graph neural network framework to implement a link prediction in a multiplex network environment is provided. The computing apparatus includes a processor; a memory; and a communication interface coupled to each of the processor and the memory. The processor is configured to: identify a plurality of layers of a multiplex network, each respective layer of the plurality of layers including a respective plurality of nodes; for each node included in at least a first layer from among the plurality of layers, provide a structural node label and determine a common embedding across all of the plurality of layers and an individual embedding for each individual layer from among the plurality of layers; use a k-nearest approach to select a subset of the plurality of layers for performing link prediction with respect to each layer based on the determined embeddings; and perform a link prediction by determining a respective feed-forward network with respect to each layer included in the selected subset.

The processor may be further configured to provide the structural node label and determine of the common embedding and the individual embedding for each node included in at least ten layers from among the plurality of layers.

The processor may be further configured to select a value of k based on computing a nearest neighbor embedding across all of the layers included in the plurality of layers.

The processor may be further configured to use the k-nearest approach to select the subset by randomly selecting a predetermined number of layers for performing the link prediction for each layer.

The processor may be further configured to use the k-nearest approach to select the subset by: selecting a predetermined number of layers from among the plurality of layers; determining, for each of the predetermined number of layers, a respective count of a number of selections by a k-nearest layer; and selecting the subset for performing the link prediction based on the determined counts for all layers included in the predetermined number of layers.

The processor may be further configured to provide the structural node label by using a double-radius node labeling protocol to assign a respective label to each node.

The processor may be further configured to perform the link prediction for a particular layer by using a self-attention mechanism to combine information that relates to at least two layers that are different from the particular layer with the determined embeddings in order to perform the link prediction.

According to yet another exemplary embodiment, a non-transitory computer readable storage medium storing instructions for using a graph neural network framework to implement a link prediction in a multiplex network environment is provided. The storage medium includes executable code which, when executed by a processor, causes the processor to: identify a plurality of layers of a multiplex network, each respective layer of the plurality of layers including a respective plurality of nodes; for each node included in at least a first layer from among the plurality of layers, provide a structural node label and determine a common embedding across all of the plurality of layers and an individual embedding for each individual layer from among the plurality of layers; use a k-nearest approach to select a subset of the plurality of layers for performing link prediction with respect to each layer based on the determined embeddings; and perform a link prediction by determining a respective feed-forward network with respect to each layer included in the selected subset.

The executable code may be further configured to cause the processor to provide the structural node label and determine the common embedding and the individual embedding for each node included in at least ten layers from among the plurality of layers.

The executable code may be further configured to cause the processor to select a value of k based on computing a nearest neighbor embedding across all of the layers included in the plurality of layers.

The executable code may be further configured to cause the processor to use the k-nearest approach to select the subset by randomly selecting a predetermined number of layers for performing the link prediction for each layer.

The executable code may be further configured to cause the processor to use the k-nearest approach to select the subset by: selecting a predetermined number of layers from among the plurality of layers; determining, for each of the predetermined number of layers, a respective count of a number of selections by a k-nearest layer; and selecting the subset for performing the link prediction based on the determined counts for all layers included in the predetermined number of layers.

The executable code may be further configured to cause the processor to provide the structural node label by using a double-radius node labeling protocol to assign a respective label to each node.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
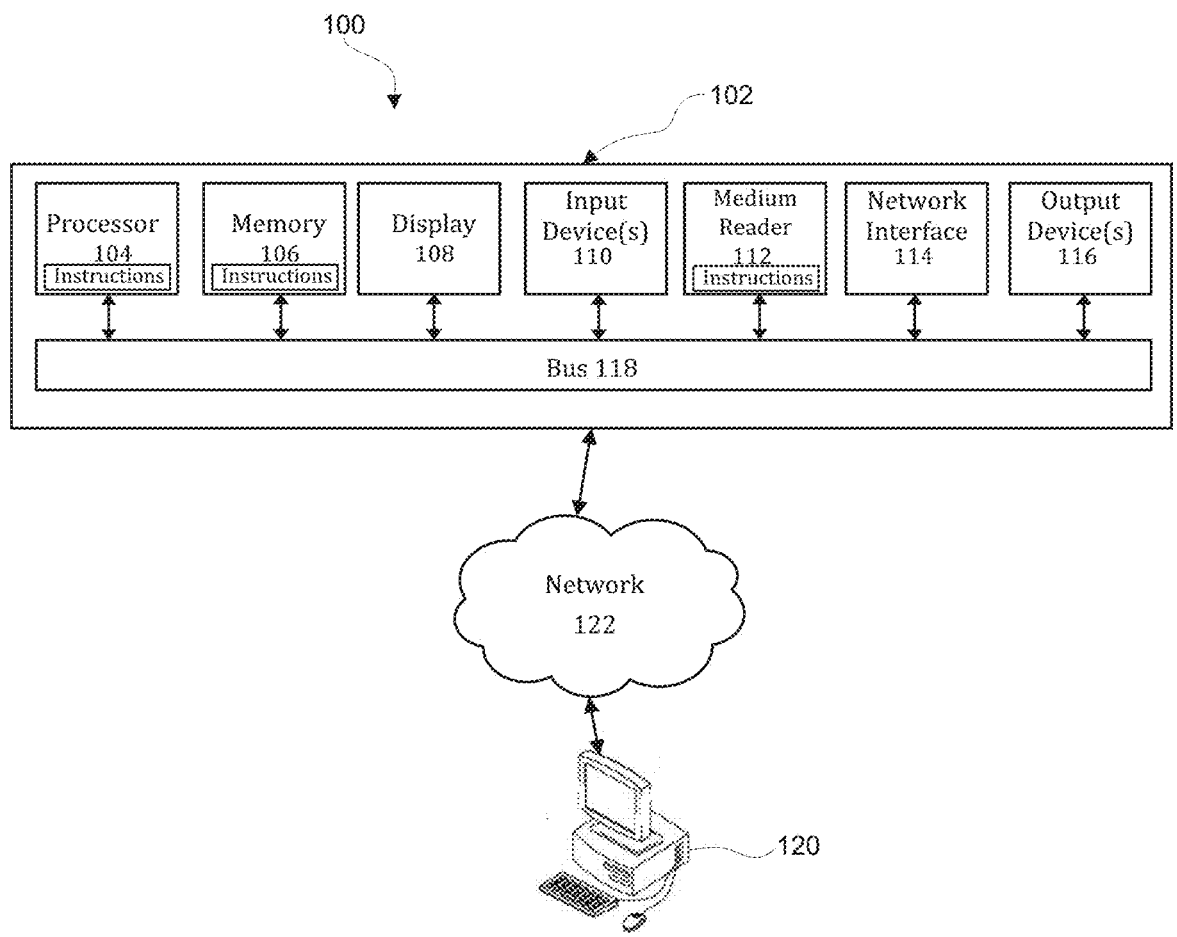
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a graph neural network framework to implement a link prediction in a large multiplex network environment.

Figure 2:
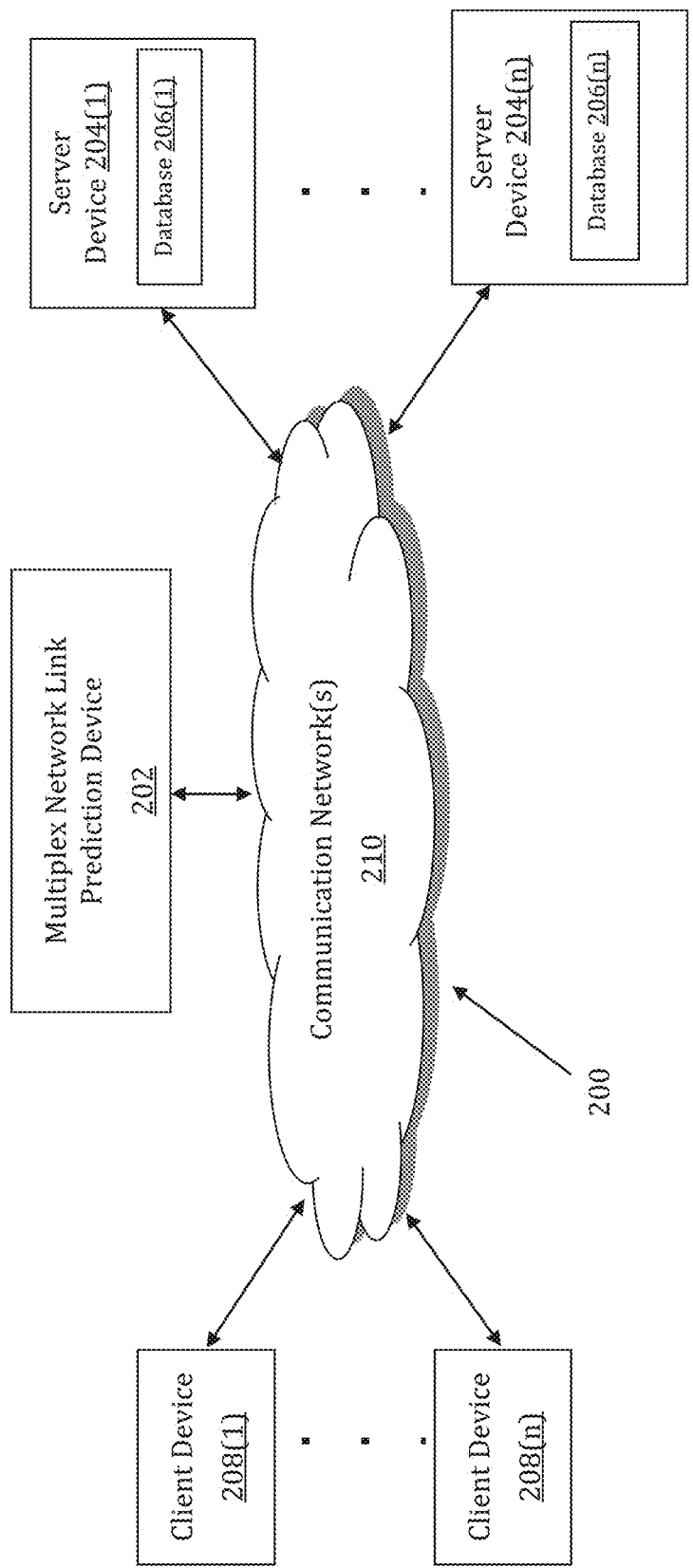
FIG. 2 illustrates an exemplary diagram of a network environment.

Referring to FIG. 2, a schematic of an exemplary network environment 200 for implementing a method for using a graph neural network framework to implement a link prediction in a large multiplex network environment is illustrated. In an exemplary embodiment, the method is executable on any networked computer platform, such as, for example, a personal computer (PC).

The method for using a graph neural network framework to implement a link prediction in a large multiplex network environment may be implemented by an Multiplex Network Link Prediction (MNLP) device 202. The MNLP device 202 may be the same or similar to the computer system 102 as described with respect to FIG. 1. The MNLP device 202 may store one or more applications that can include executable instructions that, when executed by the MNLP device 202, cause the MNLP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MNLP device 202 itself, may be located in virtual server(s) running in a cloud-based computing environment rather than being tied to one or more specific physical network computing devices. Also, the application(s) may be running in one or more virtual machines (VMs) executing on the MNLP device 202. Additionally, in one or more embodiments of this technology, virtual machine(s) running on the MNLP device 202 may be managed or supervised by a hypervisor.

In the network environment 200 of FIG. 2, the MNLP device 202 is coupled to a plurality of server devices 204(1)-204(n) that hosts a plurality of databases 206(1)-206(n), and also to a plurality of client devices 208(1)-208(n) via communication network(s) 210. A communication interface of the MNLP device 202, such as the network interface 114 of the computer system 102 of FIG. 1, operatively couples and communicates between the MNLP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MNLP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MNLP devices that efficiently implement a method for using a graph neural network framework to implement a link prediction in a large multiplex network environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MNLP device 202 may be a standalone device or integrated with one or more other devices or apparatuses, such as one or more of the server devices 204(1)-204(n), for example. In one particular example, the MNLP device 202 may include or be hosted by one of the server devices 204(1)-204(n), and other arrangements are also possible. Moreover, one or more of the devices of the MNLP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MNLP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to applications included in a multiplex network and known links among entities within a particular social network.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MNLP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MNLP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MNLP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MNLP device 202, the server devices 204(1)-204(n), or the client devices 208(1)-208(n), for example, may be configured to operate as virtual instances on the same physical machine. In other words, one or more of the MNLP device 202, the server devices 204(1)-204(n), or the client devices 208(1)-208(n) may operate on the same physical device rather than as separate devices communicating through communication network(s) 210. Additionally, there may be more or fewer MNLP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
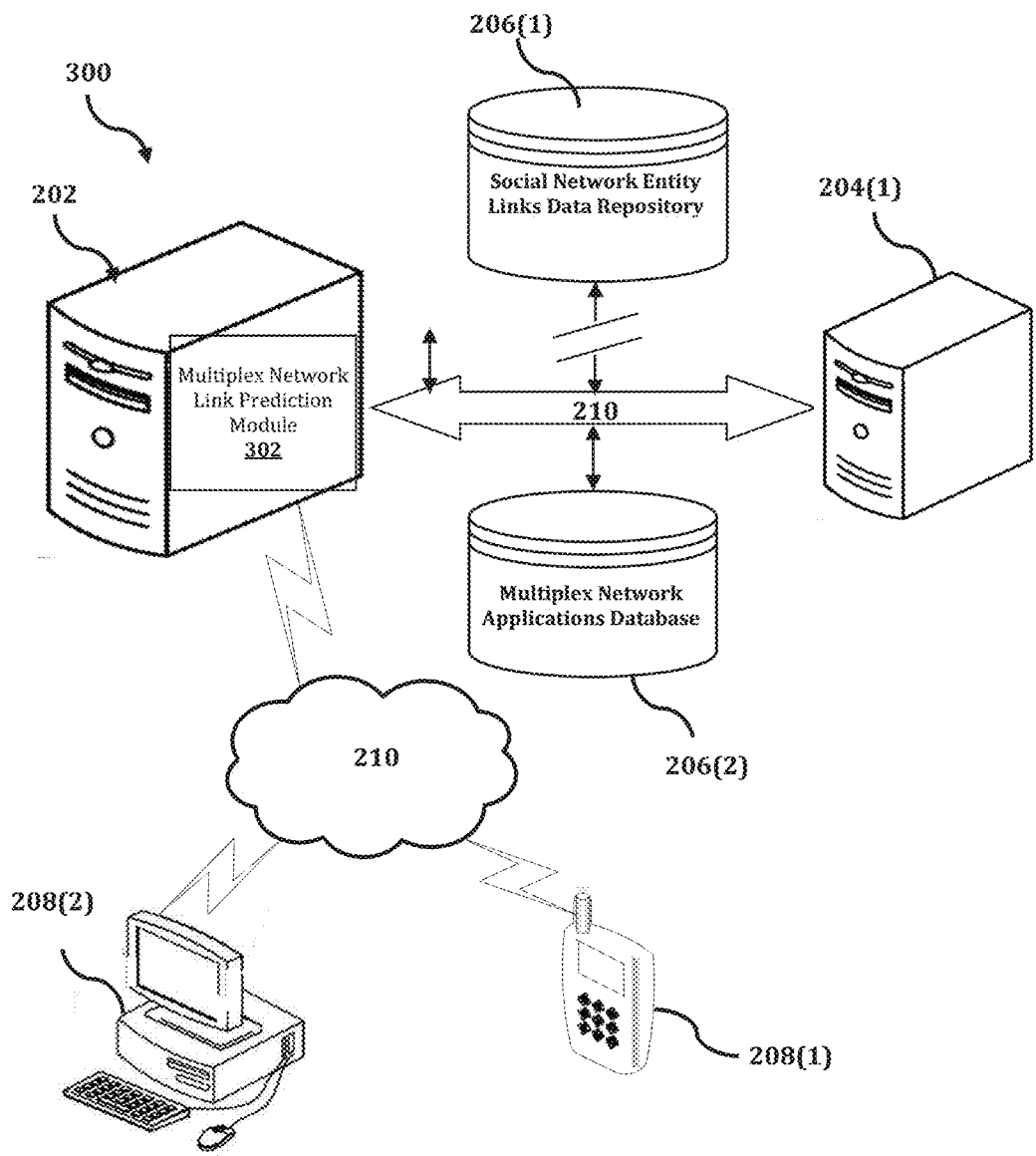
FIG. 3 shows an exemplary system for implementing a method for using a graph neural network framework to implement a link prediction in a large multiplex network environment.

The MNLP device 202 is described and illustrated in FIG. 3 as including a multiplex network link prediction module 302, although it may include other rules, policies, modules, databases, or applications, for example. As will be described below, the multiplex network link prediction module 302 is configured to implement a method for using a graph neural network framework to implement a link prediction in a large multiplex network environment.

An exemplary process 300 for implementing a mechanism for using a graph neural network framework to implement a link prediction in a large multiplex network environment by utilizing the network environment of FIG. 2 is illustrated as being executed in FIG. 3. Specifically, a first client device 208(1) and a second client device 208(2) are illustrated as being in communication with MNLP device 202. In this regard, the first client device 208(1) and the second client device 208(2) may be "clients" of the MNLP device 202 and are described herein as such. Nevertheless, it is to be known and understood that the first client device 208(1) and/or the second client device 208(2) need not necessarily be "clients" of the MNLP device 202, or any entity described in association therewith herein. Any additional or alternative relationship may exist between either or both of the first client device 208(1) and the second client device 208(2) and the MNLP device 202, or no relationship may exist.

Further, MNLP device 202 is illustrated as being able to access a social network entity links data repository 206(1) and a multiplex network applications database 206(2). The multiplex network link prediction module 302 may be configured to access these databases for implementing a method for using a graph neural network framework to implement a link prediction in a large multiplex network environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MNLP device 202 via broadband or cellular communication. Of course, these embodiments are merely exemplary and are not limiting or exhaustive.

Upon being started, the multiplex network link prediction management module 302 executes a process for using a graph neural network framework to implement a link prediction in a large multiplex network environment. An exemplary process for using a graph neural network framework to implement a link prediction in a large multiplex network environment is generally indicated at flowchart 400 in FIG. 4.

Figure 4:
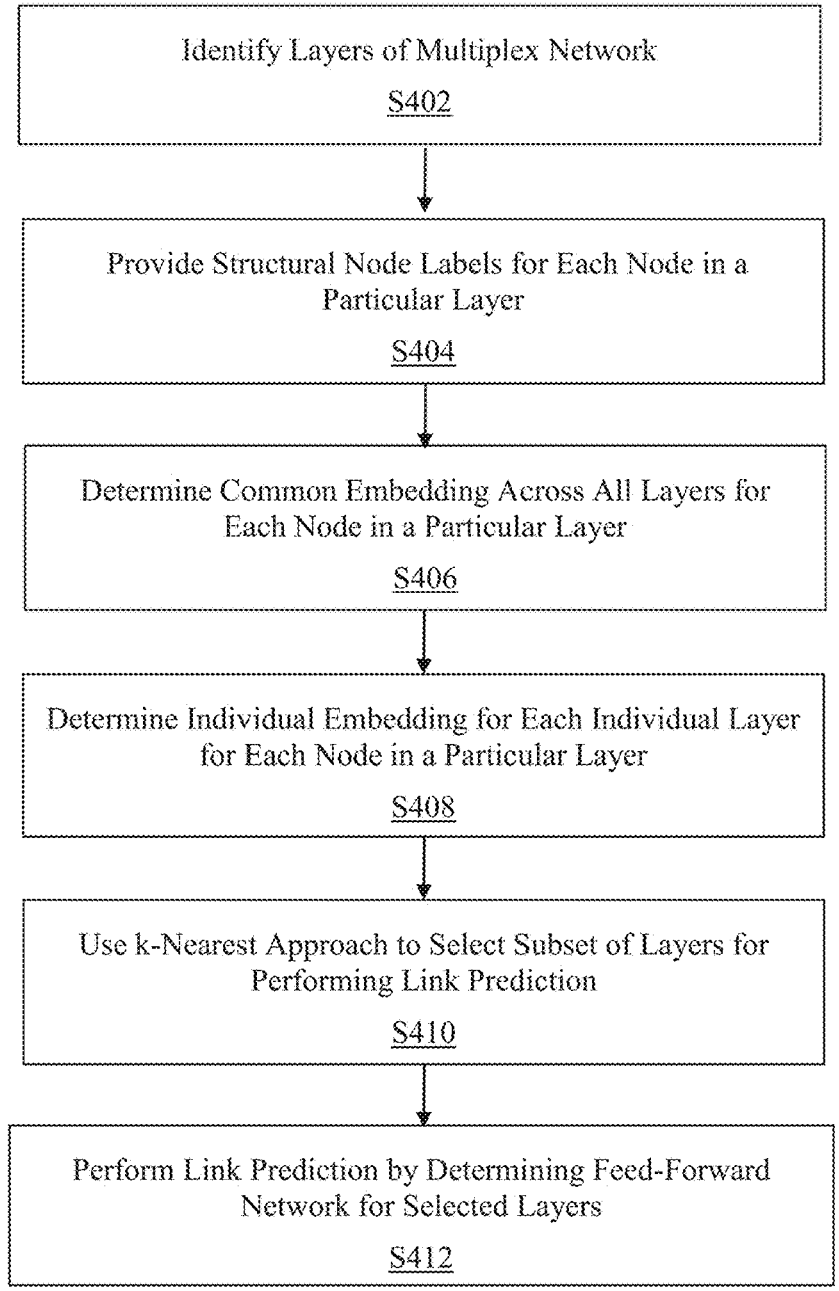
FIG. 4 is a flowchart of an exemplary process for implementing a method for using a graph neural network framework to implement a link prediction in a large multiplex network environment.

In process 400 of FIG. 4, at step S402, the multiplex network link prediction module 302 identifies layers that are included in a multiplex network. Each layer includes a respective set of nodes. In an exemplary embodiment, the number of layers in the network may be between two (2) and ten (10), or it may be between 10 and 200, or it may be greater than 200, or it may be in the thousands.

At step S404, the multiplex network link prediction module 302 provides structural node labels for each node in a particular layer. In an exemplary embodiment, the node labeling may be performed by using a double-radius node labeling (DRNL) protocol to assign a respective label to each node.

At step S406, the multiplex network link prediction module 302 determines a common embedding across all layers of the multiplex network for each node in the particular layer. Then, at step S408, the multiplex network link prediction module 302 determines, on a node-by-node basis, an individual embedding for each individual layer in the multiplex network. In an exemplary embodiment, the node labeling and embedding determination steps S404, S406, and S408 may be repeated for a predetermined number of layers, such as, for example, ten (10), 25, or any other suitable number.

At step S410, the multiplex network link prediction module 302 uses a k-nearest approach to select a subset of layers from within the multiplex network for performing a link prediction operation with respect to each layer based on the determined embeddings. In an exemplary embodiment, the use of the k-nearest approach for layer selection may be performed by randomly selecting a predetermined number of layers. Alternatively, the layer selection step may be performed by 1) choosing a fixed number of layers; 2) determining, for each of the fixed number of layers, a respective count of a number of selections by a k-nearest layer; and 3) selecting the subset of layers for performing the link prediction based on the determined numbers of counts. These techniques are described in greater detail below.

At step S412, the multiplex network prediction module 302 performs a link prediction operation with respect to each of the selected subset of layers by determining a respective feed-forward network with respect to each such layer.

In an exemplary embodiment, an issue based on embedding models that is related to the way information is aggregated across layers in multiplex network link prediction is addressed by using a graph neural network (GNN). Conventionally, a network may be thought of as a graph with a single link between two nodes. However, in many real-world settings, two nodes may be connected in multiple ways. For example, consider the trading patterns across countries where two countries are connected in multiple ways based on which commodities they trade, e.g., country A may trade rice and soybeans with country B but only rice with another country C. Considering all such commodities, a rich pattern of connectivity, i.e., multiplexity, results. A multiplex network is a representation of such connectivity. A sub-network where only one type of connection is considered as a layer of the network.

Modeling multiplex networks is a fast-growing area of research due to the increasing availability of such data and algorithmic challenges that arise in handling them. A straightforward approach is to treat each layer separately and apply either supervised or heuristic methods, but this is not ideal because it does not utilize the rich structure of correlations across various layers that may exist in the network. Since the number of layers could be potentially large, e.g., in the thousands, it becomes challenging for very large networks with millions of nodes and/or edges. One may be able to limit the samples to a subgraph of the network, but dealing with all of the layers remains expensive.

In an exemplary embodiment, the following setting for very large layer networks is introduced. Consider a scenario where layers are owned by different entities, e.g., different social networks. An up-and-coming social network enters the market and would like to establish itself in one of the niche verticals. Given its limited budget, it would like to make a deal with a few established social networks for recommending new connections to its users. The problem is to figure out which companies provide the fledgling network the best predictability for the specific domain. It is assumed that each company provides a limited trial where one can evaluate the link prediction performance and at the end of the trial period, one must select a few companies which provide the best performance.

In an exemplary embodiment, the graph neural network (GNN) framework is used to embed the sub-graphs corresponding to various layers of networks and jointly learn a classifier which combines these embeddings to predict the existence of links in the corresponding layer. Label information from the layers is utilized to boost the performance of the models.

Two architectures for combining the information may be used. First, a k-nearest approach of selecting the relevant layers for prediction may be used in order to learn the simplest model which helps predict the existence of links and prune out the layers which may not be relevant for the prediction task. This approach has an added benefit that at inference time, there is no need to embed all of the layers for prediction with a given layer. This approach is especially useful for predicting at one or a few layers utilizing the information from a large multiplex network. Second, a transformer-inspired approach to learn the best combination of layers which learns the attention-based function of the layers for any given layer is used. This approach is best suited for cases where access to the full multiplex network is available, and jointly learning a model for all of the layers at once is desired.

Figure 5:
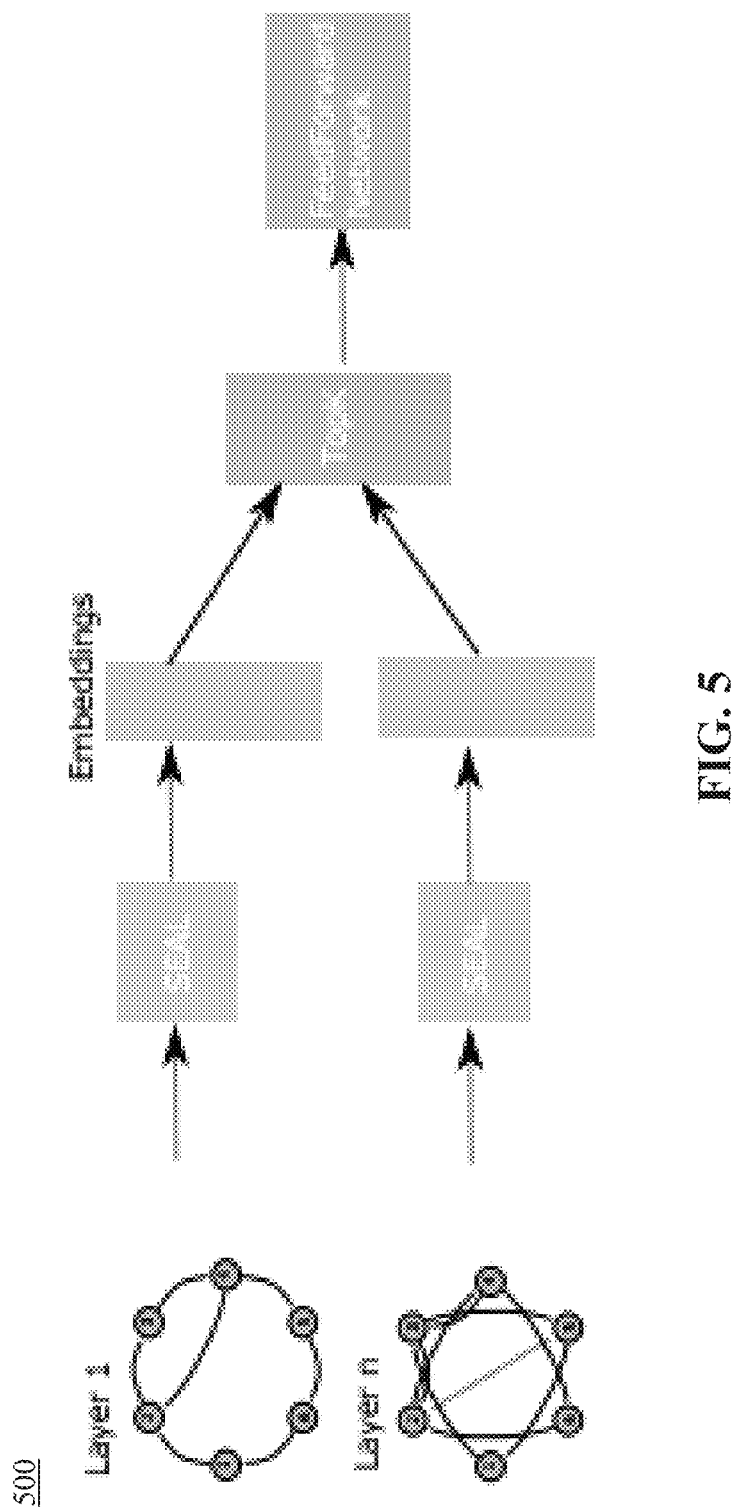
FIG. 5 is a model diagram that illustrates an architecture for executing a method for using a graph neural network framework to implement a link prediction in a large multiplex network environment, according to an exemplary embodiment.

FIG. 5 is a model diagram 500 that illustrates an architecture for executing a method for using a graph neural network framework to implement a link prediction in a large multiplex network environment, according to an exemplary embodiment.

In an exemplary embodiment, a method for using a graph neural network framework to implement a link prediction in a large multiplex network environment may be executed by using Algorithm 1 that is may be expressed as follows:

---

Algorithm 1

Receive L-layers of graphs $\{G_1, G_2, \ldots G_L\}$
Generate train and test splits for each of the layers
Extract the local neighborhoods using Double-Radius Node Labeling (DRNL)
Embed the neighborhoods using the DGCNN architecture
If K-nearest and not fixed Then
    K-nearest extraction of the relevant layers
Else If K-nearest and fixed Then
    K-nearest layers extraction
    Train model
    Extract c-fixed layers based on counts
    K-nearest layers extraction based on new input
Else
    Return attention weights across all layers at once
End If
Learn individual feed-forward networks for each layer

---

As illustrated in FIG. 5, the model 500 extracts the neighborhoods corresponding to the link prediction task as in SEAL using the DGCNN graph neural network model. The obtained embeddings are then fed into a k-nearest differentiable layer which selects the top neighborhoods corresponding to a predetermined target layer, and the selected neighborhoods are then input into a feedforward network with a binary loss.

Individual models: The local sub-graphs for each of the layers is embedded by passing it through the DGCNN graph neural network separately, along with the corresponding label information with a layer-specific feedforward neural network. The embedding network is the same across all the layers and is jointly learned along with feedforward network given the training data consisting of subgraphs corresponding to node pairs where links exist or do not exist. In particular, the label information correspond to one-hot vectors from the other layers in the form of dense embeddings. A potential issue is that there are a large number of parameters that must be learned because there is an individual feedforward network for each layer, and therefore, when there are hundreds or thousands of layers, this will scale quadratically.

K-nearest layer: All the other layers may not be informative for a particular layer and it may be prudent to limit to the set of k-nearest layers for a suitably chosen value of k. Sorting objects occurs in many machine learning tasks, but incorporating it into a deep network presents challenges. First, sorting is not differentiable with respect to its input. There are several approaches for incorporating k-nearest neighbors differentiable operators in deep learning models, such as, for example, the NeuralSort operator for sorting the layers for a given set of embeddings corresponding to a target embedding. At a high level, this works by enabling a continuous relaxation of the output of a sorting operator from permutation matrices to the set of unimodal row-stochastic matrices. This enables one to have straight-through optimization and be conveniently integrated with deep architectures. The full sorting of neighbor embedding is computed and can then be utilized by the model. In an exemplary embodiment, the k parameter may be selected as one which means for each link prediction sample, the nearest neighbor embedding is computed across all the layers and used for that task.

Scaling issues: In view of the fact that the runtime can scale quadratically with the number of layers, the following approach may be employed. A small subset of layers for learning a model for a given layer may be randomly sampled. This allows Algorithm 1 to be run on large-scale networks by randomly choosing a relatively small number of layers, such as, for example ten (10) randomly chosen layers, at each layer. This has an effect of reducing computational time from quadratic in number of layers to linear in the number of layers multiplied by the same of the random sampling set.

Fixed Layers: In some applications, it may be desirable to limit the number of layers to be sampled from to predict at a corresponding layer. In this case, the algorithm is divided into two phases, where the importance of each layer is learned based on the number of times it is selected by the k-nearest layer, and a model is learned utilizing only these layers. In an exemplary embodiment, a fixed number of rounds are explored to determine counts for the number of times each layer has been used for the prediction tasks. The top selected layers from the exploration phase are kept and used for learning the model as implemented by Algorithm 1. This corresponds to the commit phase of Algorithm 1, and ideally, only enough exploration is done to identify the top performing layers. Regarding implementation, this corresponds to pruning the original multiplex network to these selected layers for each corresponding layer and then learning a new model. It is noted that the number of layers that can be selected may be higher than the k-nearest parameter, i.e., k-nearest layers is a local selection of the embedded subgraph, whereas fixed layers is a global selection of the layers which are closest to the given layer.

Self-Attention Model: A self-attention mechanism may be used to combine information from other layers when making a prediction at any given layer. In an exemplary embodiment, three weight sets of weights $W^Q$, $W^K$ and $W^V$ may be trained, and then multiplied by the SEAL embeddings to arrive at the Q, W, and K used in the usual formulation of self-attention. The attention vectors for each of the layers are then the rows of SOFTMAX ($QK^T$) which are multiplied by V to obtain the output of the attention mechanism. Multiple attention heads are used, and another set of weights are trained to combine the outputs of each head. The resulting values are then passed through a multilayer perceptron (MLP) to obtain a final prediction for the predicted embedding of a layer.

Accordingly, with this technology, an optimized process for using a graph neural network framework to implement a link prediction in a large multiplex network environment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using a graph neural network framework to implement a link prediction in a multiplex network environment, the method being implemented by at least one processor, the method comprising:
identifying, by the at least one processor, a plurality of layers of a multiplex network, each respective layer of the plurality of layers including a respective plurality of nodes;
for each node included in at least a first layer from among the plurality of layers, providing, by the at least one processor, a structural node label and determining, by the at least one processor, a common embedding across all of the plurality of layers and an individual embedding for each individual layer from among the plurality of layers;
using, by the at least one processor, a k-nearest approach to select a subset of the plurality of layers for performing link prediction with respect to each layer based on the determined embeddings; and
performing, by the at least one processor, a link prediction by determining a respective feed-forward network with respect to each layer included in the selected subset.

2. The method of claim 1, wherein the providing of the structural node label and the determining of the common embedding and the individual embedding is performed for each node included in at least ten layers from among the plurality of layers.

3. The method of claim 1, wherein a value of k is selected based on computing a nearest neighbor embedding across all of the layers included in the plurality of layers.

4. The method of claim 1, wherein the using of the k-nearest approach to select the subset comprises randomly selecting a predetermined number of layers for performing the link prediction for each layer.

5. The method of claim 1, wherein the using of the k-nearest approach to select the subset comprises:
selecting a predetermined number of layers from among the plurality of layers;
determining, for each of the predetermined number of layers, a respective count of a number of selections by a k-nearest layer; and
selecting the subset for performing the link prediction based on the determined counts for all layers included in the predetermined number of layers.

6. The method of claim 1, wherein the providing of the structural node label comprises using a double-radius node labeling protocol to assign a respective label to each node.

7. The method of claim 1, wherein the performing of the link prediction for a particular layer comprises using a self-attention mechanism to combine information that relates to at least two layers that are different from the particular layer with the determined embeddings in order to perform the link prediction.

8. A computing apparatus for using a graph neural network framework to implement a link prediction in a multiplex network environment, the computing apparatus comprising:
a processor;
a memory; and
a communication interface coupled to each of the processor and the memory,
wherein the processor is configured to:
identify a plurality of layers of a multiplex network, each respective layer of the plurality of layers including a respective plurality of nodes;
for each node included in at least a first layer from among the plurality of layers, provide a structural node label and determine a common embedding across all of the plurality of layers and an individual embedding for each individual layer from among the plurality of layers;
use a k-nearest approach to select a subset of the plurality of layers for performing link prediction with respect to each layer based on the determined embeddings; and
perform a link prediction by determining a respective feed-forward network with respect to each layer included in the selected subset.

9. The computing apparatus of claim 8, wherein the processor is further configured to provide the structural node label and determine of the common embedding and the individual embedding for each node included in at least ten layers from among the plurality of layers.

10. The computing apparatus of claim 8, wherein the processor is further configured to select a value of k based on computing a nearest neighbor embedding across all of the layers included in the plurality of layers.

11. The computing apparatus of claim 8, wherein the processor is further configured to use the k-nearest approach to select the subset by randomly selecting a predetermined number of layers for performing the link prediction for each layer.

12. The computing apparatus of claim 8, wherein the processor is further configured to use the k-nearest approach to select the subset by:
selecting a predetermined number of layers from among the plurality of layers;
determining, for each of the predetermined number of layers, a respective count of a number of selections by a k-nearest layer; and
selecting the subset for performing the link prediction based on the determined counts for all layers included in the predetermined number of layers.

13. The computing apparatus of claim 8, wherein the processor is further configured to provide the structural node label by using a double-radius node labeling protocol to assign a respective label to each node.

14. The computing apparatus of claim 8, wherein the processor is further configured to perform the link prediction for a particular layer by using a self-attention mechanism to combine information that relates to at least two layers that are different from the particular layer with the determined embeddings in order to perform the link prediction.

15. A non-transitory computer readable storage medium storing instructions for using a graph neural network framework to implement a link prediction in a multiplex network environment, the storage medium comprising executable code which, when executed by a processor, causes the processor to:
   identify a plurality of layers of a multiplex network, each respective layer of the plurality of layers including a respective plurality of nodes;
   for each node included in at least a first layer from among the plurality of layers, provide a structural node label and determine a common embedding across all of the plurality of layers and an individual embedding for each individual layer from among the plurality of layers;
   use a k-nearest approach to select a subset of the plurality of layers for performing link prediction with respect to each layer based on the determined embeddings; and
   perform a link prediction by determining a respective feed-forward network with respect to each layer included in the selected subset.

16. The storage medium of claim 15, wherein the executable code is further configured to cause the processor to provide the structural node label and determine the common embedding and the individual embedding for each node included in at least ten layers from among the plurality of layers.

17. The storage medium of claim 15, wherein the executable code is further configured to cause the processor to select a value of k based on computing a nearest neighbor embedding across all of the layers included in the plurality of layers.

18. The storage medium of claim 15, wherein the executable code is further configured to cause the processor to use the k-nearest approach to select the subset by randomly selecting a predetermined number of layers for performing the link prediction for each layer.

19. The storage medium of claim 15, wherein the executable code is further configured to cause the processor to use the k-nearest approach to select the subset by:
   selecting a predetermined number of layers from among the plurality of layers;
   determining, for each of the predetermined number of layers, a respective count of a number of selections by a k-nearest layer; and
   selecting the subset for performing the link prediction based on the determined counts for all layers included in the predetermined number of layers.

20. The storage medium of claim 15, wherein the executable code is further configured to cause the processor to provide the structural node label by using a double-radius node labeling protocol to assign a respective label to each node.

* * * * *